United States Patent
Kameyama et al.

(10) Patent No.: US 9,001,313 B2
(45) Date of Patent: Apr. 7, 2015

(54) LASER RADAR DEVICE, SAFE LANDING SENSOR FOR PLANETFALL, DOCKING SENSOR FOR SPACE APPARATUS, SPACE DEBRIS COLLECTION SENSOR, AND VEHICLE-MOUNTED COLLISION AVOIDANCE SENSOR

(75) Inventors: Shumpei Kameyama, Tokyo (JP); Masaharu Imaki, Tokyo (JP); Nobuki Kotake, Tokyo (JP); Hidenobu Tsuji, Tokyo (JP); Hideaki Ochimizu, Tokyo (JP); Mikio Takabayashi, Tokyo (JP); Yoshihito Hirano, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 14/236,792

(22) PCT Filed: Nov. 15, 2011

(86) PCT No.: PCT/JP2011/006358
§ 371 (c)(1),
(2), (4) Date: Feb. 3, 2014

(87) PCT Pub. No.: WO2013/072956
PCT Pub. Date: May 23, 2013

(65) Prior Publication Data
US 2014/0168634 A1    Jun. 19, 2014

(51) Int. Cl.
*G01S 17/02* (2006.01)
*B64G 1/64* (2006.01)
(Continued)

(52) U.S. Cl.
CPC . *G01S 17/02* (2013.01); *B64G 1/64* (2013.01); *B64G 1/66* (2013.01); *G01S 17/88* (2013.01);
(Continued)

(58) Field of Classification Search
USPC ............ 356/3.01–3.15, 4.01–4.1, 5.01–5.15, 356/6–22, 28, 28.5, 139.01–139.1
See application file for complete search history.

(56) References Cited

U.S. PATENT DOCUMENTS

2011/0234450 A1*    9/2011    Sakai et al.    .................... 342/70

FOREIGN PATENT DOCUMENTS

JP    9 113622    5/1997
JP    10 162119    6/1998
(Continued)

OTHER PUBLICATIONS

Kameyama, S., et al., "Development of long range, real-time, and high resolution 3-D Imaging LADAR", Proc. of SPIE, vol. 8192, pp. 819205-1 to 819205-6, (2011).

(Continued)

*Primary Examiner* — Luke Ratcliffe
(74) *Attorney, Agent, or Firm* — Oblon, McClelland, Maier & Neustadt, L.L.P.

(57) ABSTRACT

A laser radar device includes: a pulse laser that outputs transmission light to a target; an transmission optical system that makes the transmission light at a predetermined beam spread angle; a light-receiving element array that receives scattered light from the target and converts the light to an electric signal; an electric circuit array that detects a reception intensity and a reception time from the electric signal; a range/three-dimensional shape output unit that measures a range to the target or a three-dimensional shape of the target on the basis of the reception time; a determination unit that determines whether the beam spread angle is changed or not on the basis of the reception intensity and the reception time; and a control unit that changes the beam spread angle on the basis of a determination result.

6 Claims, 4 Drawing Sheets

(51) Int. Cl.
*B64G 1/66* (2006.01)
*G01S 17/88* (2006.01)
*G01S 17/89* (2006.01)
*G01S 7/48* (2006.01)
*G01S 17/10* (2006.01)
*G01B 11/24* (2006.01)
*G01S 17/93* (2006.01)
*G01S 7/481* (2006.01)

(52) U.S. Cl.
CPC . *G01S 17/89* (2013.01); *G01S 7/48* (2013.01); *G01S 17/10* (2013.01); *G01B 11/24* (2013.01); *G01S 17/933* (2013.01); *G01S 17/936* (2013.01); *G01S 7/481* (2013.01)

(56) References Cited

FOREIGN PATENT DOCUMENTS

| JP | 2006 317304 | 11/2006 |
|---|---|---|
| JP | 2009 276248 | 11/2009 |

OTHER PUBLICATIONS

Kameyama, S., et al., "3D imaging LADAR with linear array devices: laser, detector and ROIC", Proc. of SPIE, vol. 7382, pp. 738209-1 to 738209-6 (2009).

International Search Report Issued Dec. 20, 2011 in PCT/JP11/006358 Filed Nov. 15, 2011.

\* cited by examiner

LASER RADAR DEVICE, SAFE LANDING SENSOR FOR PLANETFALL, DOCKING SENSOR FOR SPACE APPARATUS, SPACE DEBRIS COLLECTION SENSOR, AND VEHICLE-MOUNTED COLLISION AVOIDANCE SENSOR

TECHNICAL FIELD

The present invention relates to a laser radar device that measures a range (distance) to a point on a target, or ranges to a plurality of points thereon, and relates to, in particular, a laser radar device, a safe landing sensor for planetfall, a docking sensor for space apparatus, a space debris collection sensor, and a vehicle-mounted collision avoidance sensor that have an array receiver, and that combine a function of measuring a range (distance) to a specified place on a target (hereinafter, referred to as "range finding mode") with a function of measuring a three-dimensional shape of the target (hereinafter, referred to as "imaging mode").

BACKGROUND ART

Heretofore, as a laser radar device that combines a range finding mode where a range to a specified place on a target is measured with an imaging mode where a three-dimensional shape of the target is measured, the devices disclosed in Patent Document 1 and Non-Patent Document 1, for instance, are known.

In the conventional laser radar devices (imaging mode) disclosed in Patent Document 1 and Non-Patent Document 1, a laser that is a transmission pulse is formed linearly to be transmitted, and scattered light from the target with respect to the laser is received by linearly arrayed elements of an array receiver, whereby ranges to points on the target corresponding to views of the elements are instantly measured. That is, a cross-sectional shape of the target is instantly measured. When this measurement is repeated while scanning in a direction orthogonal to the linear array by a one-dimensional scanner, a two-dimensional range image is acquired. Then, based on the acquired range image and angles in transmission and reception directions corresponding to the images, a three-dimensional shape of the target is acquired.

In a condition where the imaging mode functions properly, it is obvious that the range finding mode is also operable. When the laser radar device is employed, an application to a safe landing sensor for detecting an obstacle in landing a planetary exploration spacecraft on a planet, and a docking sensor between objects, for example, satellites is promising.

PRIOR ART DOCUMENTS

Patent Document

Patent Document 1: Japanese Patent Application Laid-Open No. 2009-276248

Non-Patent Documents

Non-Patent Document 1: S. Kameyama et al., Proc. of SPIE, 819205, 2011
Non-Patent Document 2: S. Kameyama et al., Proc. of SPIE, 738209, 2009

SUMMARY OF THE INVENTION

Problems to be Solved by the Invention

However, in the conventional laser radar device for acquiring the three-dimensional shape having the array receiver, the measurement is carried out by the plurality of elements with a single pulse (single transmission optical system). For this reason, a transmission pulse energy usable for signal detection at the elements is decreased to a value in which the total transmission pulse energy is divided by the number of the elements. That is, in this laser radar device, when the transmission pulse energy has a finite value, a range achieving an excellent signal detection is largely restricted.

Therefore, there is the following problem in the conventional laser radar device: when the device falls into a condition in which the three-dimensional shape of the target cannot be measured (for example, when the range to the target is a certain value or more), it becomes difficult to perform not only the above tree-dimensional shape measurement function but also the measurement of the range to the specified place on the target at the same time. In other words, in the condition where the operation of the imaging mode becomes difficult, the operation of the range finding mode also becomes difficult at the same time.

In a use of the aforementioned safe landing sensor and docking sensor, in a far distance, information about the three-dimensional shape of the target is unnecessary, but grasping the range to the specified place is necessary by the range finding mode. Also, in a short range, information about the three-dimensional shape becomes necessary as more detailed information of the target. However, as mentioned above, in the conventional laser radar device, the operation in the range finding mode also becomes difficult in a certain specific condition (for example, the range to the target is a certain value or more), and therefore there is a problem such that in a case of an application to the above two sensors, the range to the target that can start the operation is limited to the short range.

The present invention has been made to solve the aforementioned problems, and an object of the invention is to provide a laser radar device, a safe landing sensor for planetfall, a docking sensor for space apparatus, a space debris collection sensor, and a vehicle-mounted collision avoidance sensor that have the array receiver, combine the range finding mode with the imaging mode, and can start the measurement operation at the farther distance as compared with the conventional one.

Means for Solving the Problems

A laser radar device according to the present invention includes: a light source that outputs transmission light to a target; an transmission optical system that makes the transmission light output by the light source at a predetermined beam spread angle; a light-receiving element array that receives scattered light from the target with respect to the transmission light made at the predetermined beam spread angle by the transmission optical system and that converts the resultant to an electric signal; an electric circuit array that detects a reception intensity and a reception time from the electric signal converted by the light-receiving element array; a measuring unit that measures a range to the target or a three-dimensional shape of the target on the basis of the reception time detected by the electric circuit array; a determination unit that determines whether or not the beam spread angle by the transmission optical system is changed on the basis of the reception intensity and the reception time detected by the electric circuit array; and a controller that changes the beam spread angle by the transmission optical system on the basis of a determination result by the determination unit, wherein when the range to the target shifts from a long range to a short range, the controller changes the beam spread angle by the transmission optical system on the basis of the determination result by the determination unit, and also the measuring unit shifts from a range finding mode that measures the range to the target to an imaging mode that measures a three-dimensional shape of the target.

Effect of the Invention

According to the invention, because it is configured as described above, it is possible to combine the range finding mode and the imaging mode, and start the measurement operation at the farther distance as compared with the conventional one.

BEST MODE FOR CARRYING OUT THE INVENTION

Hereinafter, embodiments of the present invention will be described in more detail with reference to the attached drawings.

Embodiment 1

Figure 1:
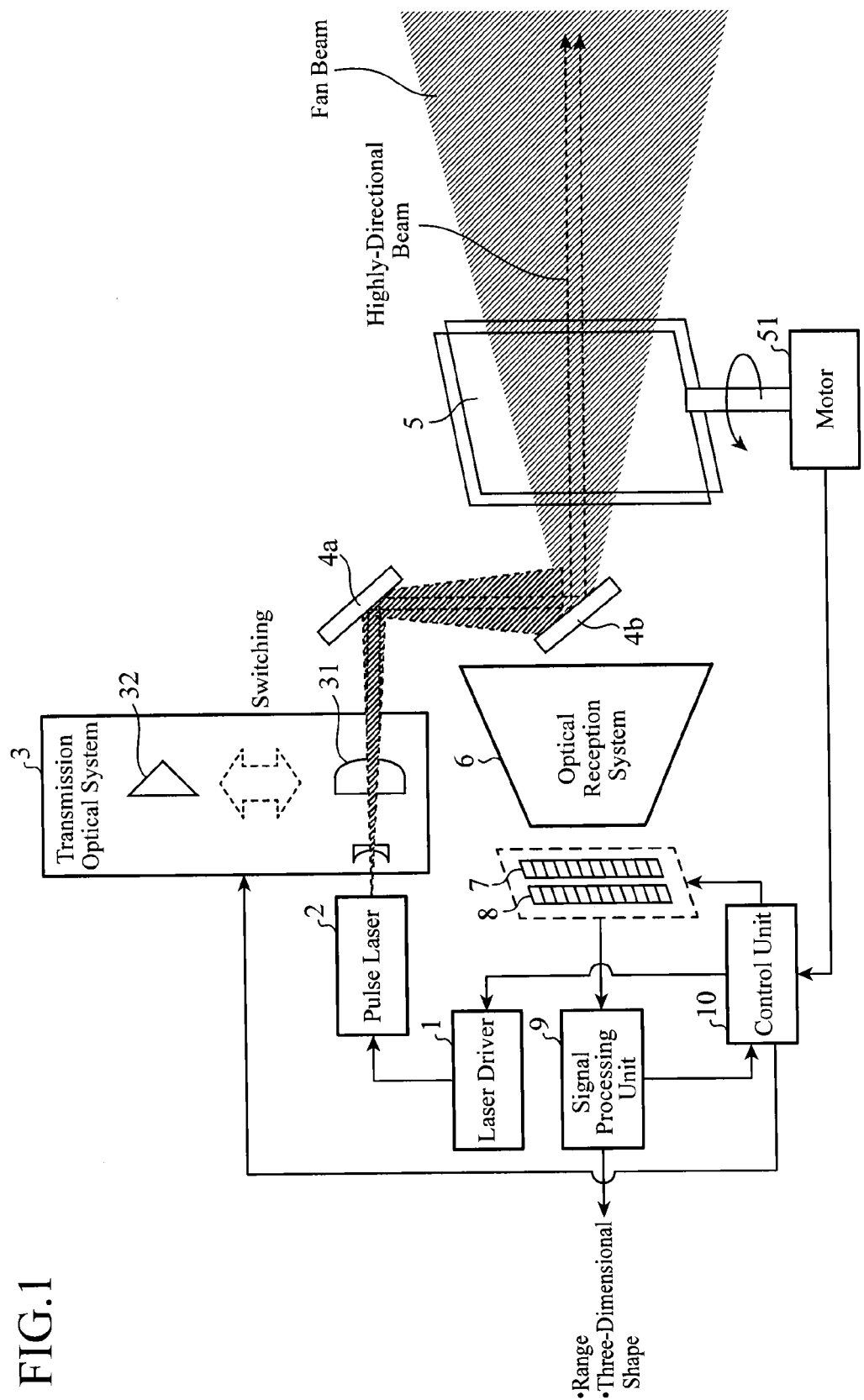
FIG. 1 is a schematic diagram showing a configuration of a laser radar device according to Embodiment 1 of the present invention.

FIG. 1 is a schematic diagram showing a configuration of a laser radar device according to Embodiment 1 of the invention.

As shown in FIG. 1, the laser radar device is configured with a laser driver 1, a pulse laser (light source) 2, an transmission optical system 3, a folding mirror 4 (in FIG. 1, two folding mirrors 4a, 4b), a scanner mirror 5, an optical reception system 6, a light-receiving element array 7, an electric circuit array 8, a signal processing unit 9, and a control unit 10.

The laser driver 1 serves to perform drive-control of the pulse laser 2 according to a signal from the control unit 10.

The pulse laser 2 serves to output a laser (transmission light) that is a predetermined transmission pulse according to a signal from the laser driver 1.

The transmission optical system 3 serves to make the laser output from the pulse laser 2 a predetermined beam spread angle, and irradiate the resultant toward a target through the folding mirror 4 and the scanner mirror 5. This transmission optical system 3 has an optical system 31 for a highly-directional beam used in a range finding mode, and an optical system 32 for a fan beam used in an imaging mode. Then, the above optical systems 31 and 32 are switched to each other according to the signal from the control unit 10, and either one of them is used as the system for the transmission beam. Note that a common collimate optical system is applicable to the optical system 31 for the highly-directional beam, and a configuration shown in Non-Patent Document 1, for example, is applicable to the optical system 32 for the fan beam.

The folding mirror 4 is a fixed mirror that guides the laser passing through the transmission optical system 3 toward the scanner mirror 5.

The scanner mirror 5 serves to change a traveling direction of the laser guided by the folding mirror 4 in such a manner that a mirror body thereof is turned when a rotary shaft of a motor 51 is turned according to the signal from the control unit 10. This scanner mirror 5 operates in the imaging mode, and changes the traveling direction of the laser in a line passing through the optical system 32 for the fan beam and the folding mirror 4 to a direction orthogonal to this line.

The optical reception system 6 serves to converge scattered light from the target with respect to the laser irradiated thereto from the transmission optical system 3 through the folding mirror 4 and the scanner mirror 5.

The light-receiving element array 7 is a linear array having a plurality of elements, and serves to receive at the elements the scattered light converged by the optical reception system 6, and convert the resultant into a reception signal consisting of an electric signal. The reception signal received and converted by the elements of the light-receiving element array 7 is output to the electric circuit array 8.

The electric circuit array 8 is a linear array having a plurality of elements, and serves to receive the reception signals from the elements of the light-receiving element array 7 at the corresponding element, and detect a reception time and a reception intensity (for example, a pulse peak intensity) of the reception signal. A configuration shown for example in Non-Patent Document 2 and so on is applicable to the electric circuit array 8. Signals indicating the reception times and reception intensities of the reception signals to be received and detected by the elements of the electric circuit array 8 are output to the signal processing unit 9.

It is noted that in FIG. 1 an output of the electric circuit array 8 is schematically connected to the signal processing unit 9 by one arrowed line. The signals from the elements of the array 8 are output in parallel to this line (wiring), or collected in one output by a multiplexer (not shown) to be output in series thereto, so that the signals from all the elements are configured to be input into the signal processing unit 9. Further, though an input into the signal processing unit 9 in FIG. 2 is also shown by one arrowed line, similarly to the above, the signals from the elements of the array 8 are output in parallel or in series to the line, so that the signals from all the elements are configured to be input into the signal processing unit 9.

The signal processing unit 9 serves to measure a range to the target or a three-dimensional shape of the target on the basis of the reception times and reception intensities of the reception signals detected by the elements of the electric circuit array 8, and also perform mode determination with the laser radar device. A detailed configuration of the signal processing unit 9 will be described later.

The control unit 10 serves to perform operation control of the units within the laser radar device. This control unit 10 switches the mode of the laser radar device according to a result of the mode determination by the signal processing unit 9. Here, in the case of setting to the range finding mode, the control unit 10 switches the transmission optical system 3 to the optical system 31 for the highly-directional beam, and controls the motor 51 to stop the turning of the scanner mirror 5. Meanwhile, in the case of setting to the imaging mode, the control unit switches the transmission optical system 3 to the optical system 32 for the fan beam, and controls the motor 51 to turn the scanner mirror 5.

Figure 2:
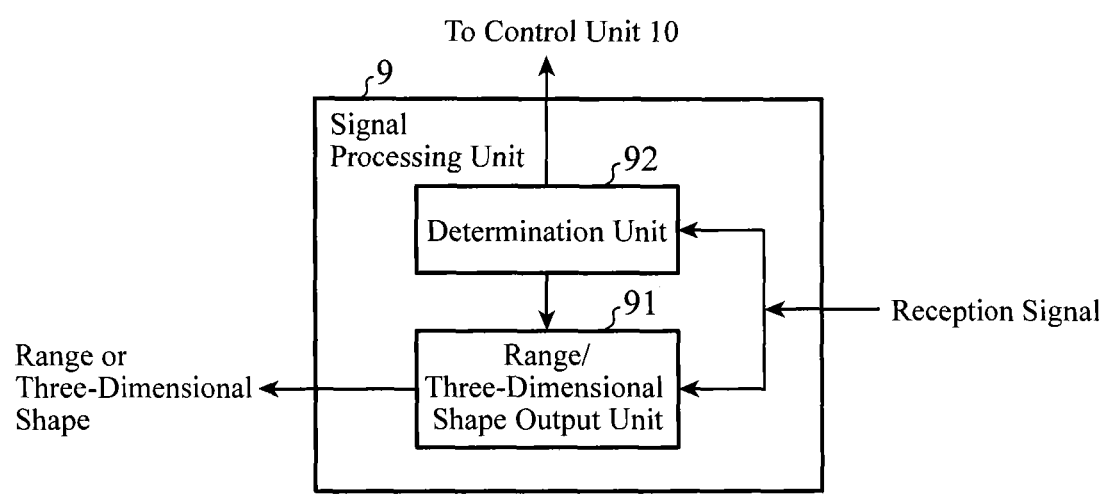
FIG. 2 is a block diagram showing an internal configuration of a signal processing unit in Embodiment 1 of the invention.

FIG. 2 is a block diagram showing an internal configuration of the signal processing unit 9 according to Embodiment 1 of the invention.

As shown in FIG. 2, the signal processing unit 9 is configured with a range/three-dimensional shape output unit (measuring unit) 91, and a determination unit 92.

The range/three-dimensional shape output unit 91 serves to measure the range to the target or the three-dimensional shape of the target on the basis of the reception times of the reception signals detected by the elements of the electric circuit array 8. Here, when the range finding mode is set, the range/three-dimensional shape output unit 91 calculates a range to a specified place on the target on the basis of the reception times. On the other hand, when the imaging mode is set, the output unit stores a value of the above range together with information about the angle of the scanner mirror 5. Then, the three-dimensional shape of the target is measured such that the values of the ranges during the turning of the scanner mirror 5 are measured and stored one by one. Signals indicating the range to the target or the three-dimensional shape of the target measured by the range/three-dimensional shape output unit 91 are output to the outside of the device.

The determination unit 92 serves to determine whether the current mode is continued or a mode switching is carried out on the basis of the reception times and reception intensities of the reception signals detected by the elements of the electric circuit array 8. A signal indicating a result of the mode determination by the determination unit 92 is output to the control unit 10.

Figure 3:
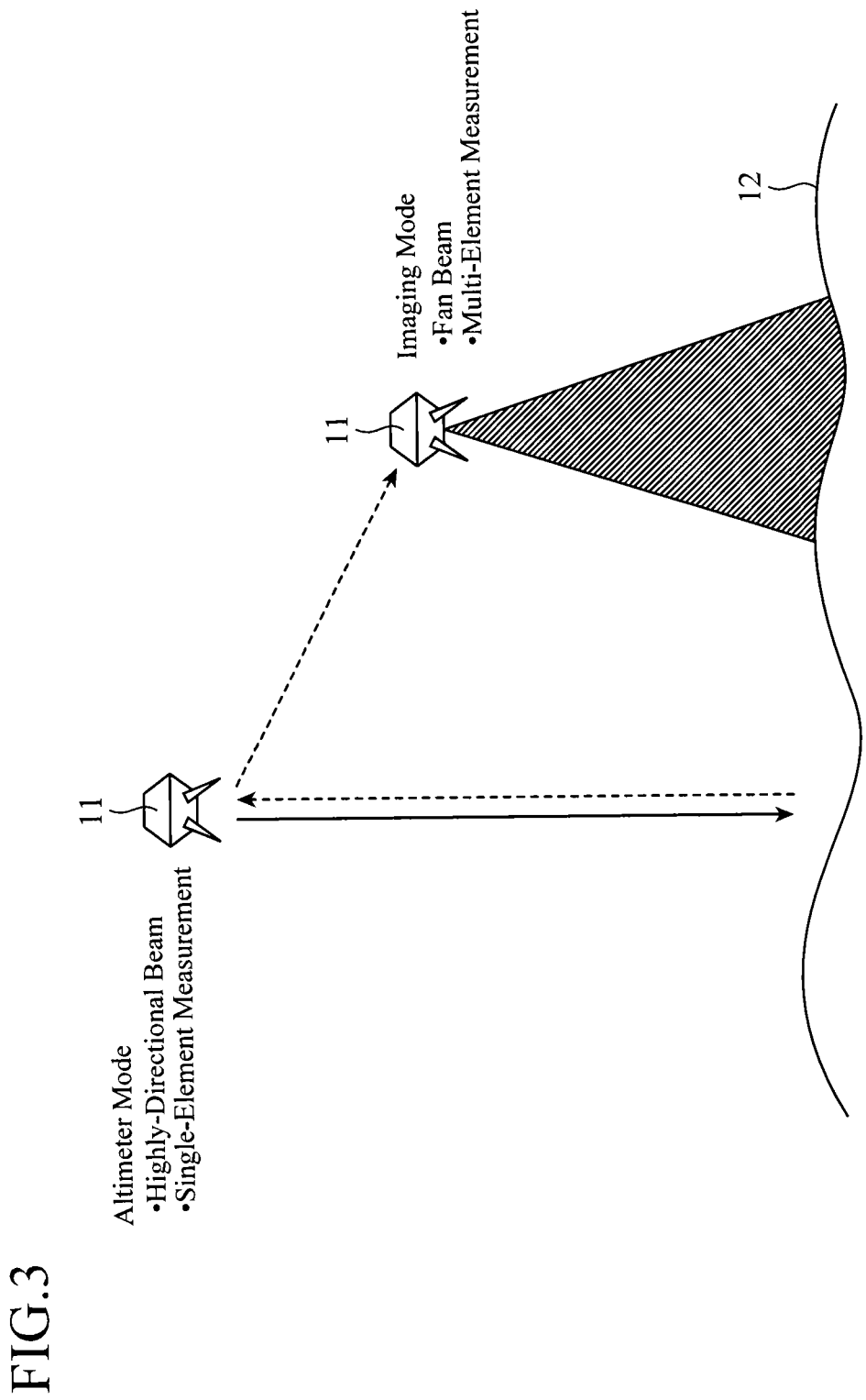
FIG. 3 is a practical schematic diagram showing a case where the laser radar device according to Embodiment 1 of the invention is applied to a safe landing sensor for planetfall.

Next, an operation of the laser radar device configured as mentioned above will be described with reference to FIGS. 3 and 4. FIG. 3 is an explanatory diagram related to a practical use in a case where the laser radar device shown in FIG. 1 is installed in a planetary exploration spacecraft 11, and applied as a sensor in making a safe landing on a planetary surface 12; and FIG. 4 is a flowchart showing an operation at that time.

Hereinafter, it is noted that the term "altimeter mode" is used as the term meaning "the range finding mode" in accordance with an image of the practical use. Further, assuming that at the start of the operation, the planetary exploration spacecraft 11 shown in FIG. 3 is located at a high altitude (left side, in the figure), it is contemplated that the operation is started in the altimeter mode.

Figure 4:
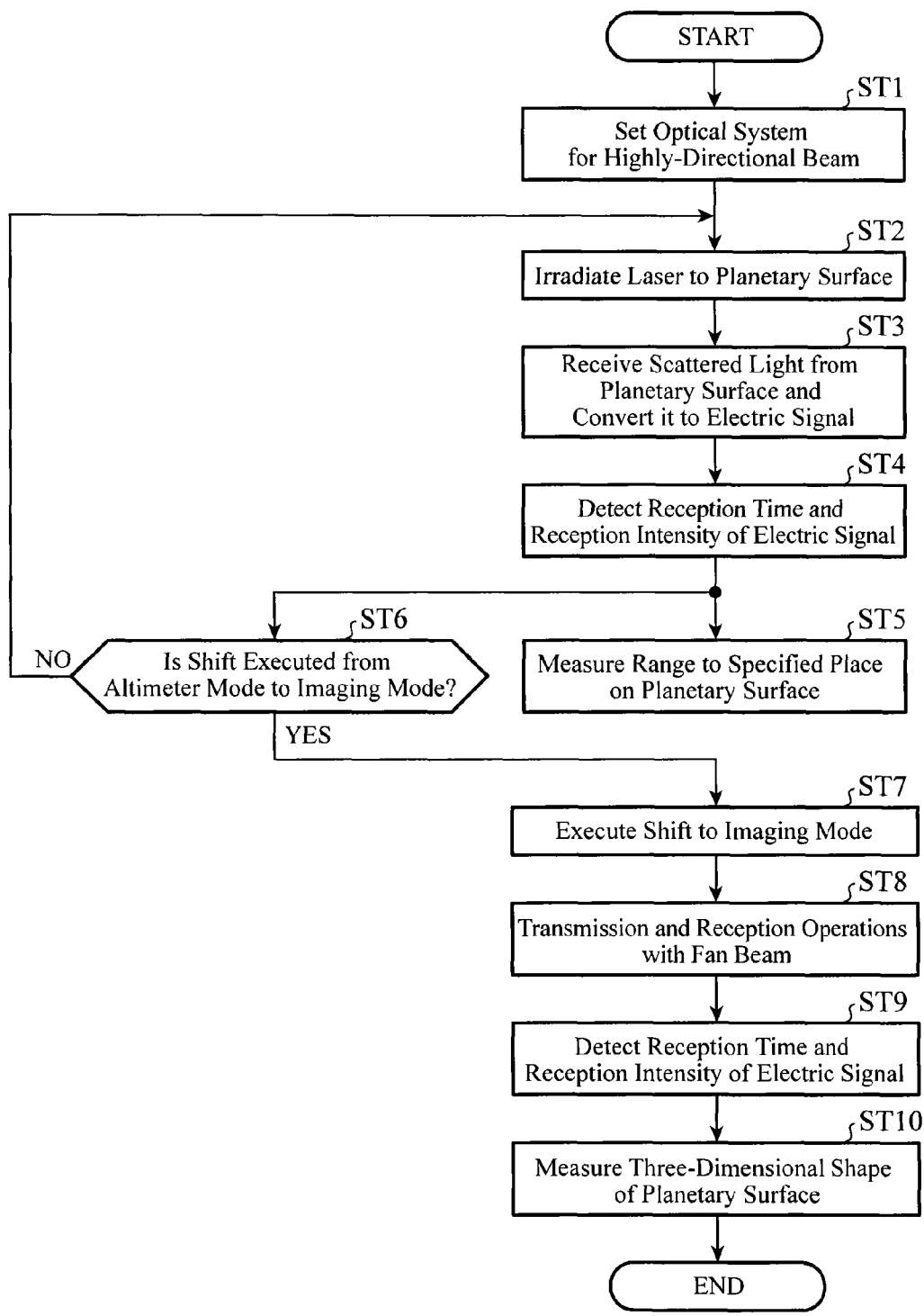
FIG. 4 is a flowchart showing an operation of the laser radar device shown in FIG. 3.

In the operation of the laser radar device, as shown in FIG. 4, the control unit 10 firstly causes the transmission optical system to set the optical system (optical system 31 for the highly-directional beam) corresponding to the altimeter mode (Step ST1). At this time, the beam spread angle of the output of the transmission optical system 3 (highly-directional beam) is set to be equivalent to an instantaneous field of view of one element of the light-receiving element array 7. Also, the beam transmission angle is set to overlap an instantaneous field of view of the specific one element of the light-receiving element array 7.

Then, the laser radar device irradiates the laser to the planetary surface 12 (Step ST2). That is, firstly, the pulse laser 2 outputs the laser that is the transmission pulse. Then, the optical system 31 for the highly-directional beam converts the laser into the highly-directional beam, and irradiates the resultant to the planetary surface 12 through the folding mirrors 4a, 4b and the scanner mirror 5. Note that the scanner mirror 5 is kept still on this occasion. In this way, a specified place on the planetary surface 12 as shown in FIG. 3 can be irradiated with the highly-directional beam.

Then, the laser radar device receives the scattered light from the planetary surface 12 (Step ST3). That is, the device receives the scattered light from the planetary surface 12 with respect to the laser irradiated in Step ST2 at the specific one element of the light-receiving element array 7 through the optical reception system 6, and converts the light to a reception signal consisting of an electric signal. The reception signal received and converted by the specific one element of the light-receiving element array 7 is output to the electric circuit array 8.

Then, the electric circuit array 8 receives the reception signal converted by the specific one element of the light-receiving element array 7 at the corresponding specific one element, and detects the reception time and the reception intensity of the reception signal (Step ST4). Signals indicating the reception time and the reception intensity of the reception signal detected by the specific one element of the electric circuit array 8 are output to the signal processing unit 9.

Then, the range/three-dimensional shape output unit 91 in the signal processing unit 9 measures the range to the specified place on the planetary surface 12 on the basis of the reception time of the reception signal detected by the specific one element of the electric circuit array 8 (Step ST5). A signal indicating the range to the planetary surface 12 measured by the range/three-dimensional shape output unit 91 is output to the outside of the device.

Further, concurrently with the operation in Step ST5, the determination unit 92 in the signal processing unit 9 determines whether to perform a shift from the altimeter mode to the imaging mode on the basis of the reception time and the reception intensity of the reception signal detected by the specific one element of the electric circuit array 8 (Step ST6). At this time, the determination unit 92 compares a predetermined threshold value with at least one of the following three determination criteria: (1) the range to the specified place on the target measured from the above reception time; (2) the above reception intensity; and (3) a reception S/N ratio determined based on the above reception intensity and a previously-known reception noise level. Then, from this comparison result, a determination is made whether the altimeter mode is continued without change or the shift to the imaging mode is performed.

Specifically, when at least one of the following is established: (1) the range to the specified place on the target is the threshold value or less; (2) the reception intensity is the threshold value or more; and (3) the reception S/N ratio is the threshold value or more, the determination is conducted to perform the shift to the imaging mode.

Basically, when the reception intensity or the reception S/N ratio is sufficiently high, the signal detection is possible with the sufficient S/N ratio at the elements even in a situation such that the intensity of the received light is dispersed to the elements by the shift to the imaging mode. Further, since the intensity of the received light becomes higher as the range to the target becomes a closer range, it is possible to grasp roughly the reception intensity from measurement results of the range. Accordingly, when it is determined whether or not any one or more of the above (1) to (3) is established, it is possible to make an automatic determination whether or not the shift to the imaging mode is to be carried out.

It is noted that in order to make the above determination, it is required to measure accurately the range and the reception intensity. Therefore, as the case may be, it is required to avoid saturation of the signal in the reception system. As a measure for this requirement, it is conceivable that an output power from the pulse laser 2 is controlled corresponding to the reception intensity such that the laser driver 1 is brought under control by the signal processing unit 9 through the control unit 10. In addition, it is also conceivable that a gain in the reception system is controlled such that the light-receiving element array 7 or the electric circuit array 8 is brought under control by the signal processing unit 9 through the control unit 10. In this case, the above determination is performed with respect to the corrected value of the reception intensity or the reception S/N ratio in consideration of these output power or gain in the reception system.

When the determination unit 92 determines to continue the range finding mode in the mode determination in Step ST6, the sequence returns to Step ST2, and continues the transmission and reception operations with the highly-directional beam are continued.

On the other hand, when the determination unit 92 determines to perform the shift to the imaging mode in the mode determination in Step ST6, the unit transmits the determination result to the control unit 10. Subsequently, the control unit 10 performs the shift to the imaging mode (Step ST7). That is, the control unit 10 switches the transmission optical system 3 to the fan beam optical system 32, and turns the scanner mirror 5 by controlling the motor 51.

Thereafter, the laser radar device performs transmission and reception operations with the fan beam (Step ST8). At this time, though the irradiated spot on the planetary surface 12 is provided in a line, the spread angle of the fan beam is determined in advance such that this spot and the instantaneous field of view of the overall light-receiving element array 7 are matched to each other. By doing so, scattered light from each point of the irradiated spot is received by the elements in the light-receiving element array 7, and converted to the electric signals.

Subsequently, the electric circuit array 8 receives the reception signal converted by the elements of the light-receiving element array 7 at the corresponding specific one element, and detects a reception time and a reception intensity of this reception signal (Step ST9). Signals indicating the reception times and reception intensities of the reception signals detected by the elements of the electric circuit array 8 are successively output to the signal processing unit 9.

Subsequently, the range/three-dimensional shape output unit 91 in the signal processing unit 9 measures a three-dimensional shape of the target on the basis of the reception times of the reception signals detected by the elements of the electric circuit array 8 (Step ST10). Specifically, the range/three-dimensional shape output unit 91 calculates the ranges to the places on the planetary surface 12 on the basis of the reception times of the reception signals detected by the elements of the electric circuit array 8. Then, these range values are stored with information about the angles of the scanner mirror 5. Then, when the range values during the turning of the scanner mirror 5 are calculated and stored, the three-dimensional shape of the planetary surface 12 is measured. Signals indicating the three-dimensional shape of the planetary surface 12 that is measured by the range/three-dimensional shape output unit 91 are output to the outside of the device.

As described above, according to Embodiment 1, since it is configured such that the transmission optical system 3 is provided with the optical system 31 for the highly-directional beam used in the range finding mode and the optical system 32 for the fan beam used in the imaging mode, and that it is determined whether the modes are switched or not based on the condition of the reception signal (any one or more of the range to the target, the reception intensity and the reception S/N ratio), the operation at a long range, which is conventionally difficult, with respect to the range finding mode becomes possible while retaining the three-dimensional shape acquisition function in the imaging mode by the array receiver.

In addition, in order to achieve a safe landing on the target, it is required to acquire a concave-convex shape on the target, namely a three-dimensional shape thereof, through the imaging mode. However, when a shift to the imaging mode in a condition of a high altitude, a condition of a low reception intensity, or a condition of a low reception S/N ratio lowers the intensity of the scattered light to be inputted to the one element, and thus there is a possibility such that the three-dimensional shape acquisition becomes unable to function. However, in the laser radar device according to Embodiment 1, a situation where the range becomes the threshold value or less is established, so that a high reception S/N ratio is promising, or a directly measured reception intensity is determined by itself to thus shift the imaging mode, and hence the shift at an optimum timing becomes possible.

Moreover, in the laser radar device according to Embodiment 1, it is assumed that when the transmission pulse is transmitted and received, the range is measured from a turnaround time thereof; however, the measuring system for the range is not limited to the aforementioned pulse system. For example, it may be provided by the following system, namely a CW modulated phase detection system: intensity-modulated light by a sine wave is transmitted and received, and then a phase difference between the transmitted and received modulated waves is measured, whereby the range is determined from the phase difference.

In addition, though in the laser radar device according to Embodiment 1, the reception system is provided by the linear array, it may be provided by a two-dimensional array. When the two-dimensional array is provided therefor, even if the angle of the highly-directional beam is deviated somewhat in either one of orthogonal and lateral directions from the viewing direction of the specific light-receiving element that is used in the altimeter mode, the beam is receivable by any one of the adjacent elements. Accordingly, when there is further provided with a function of monitoring the output values also with respect to the adjacent elements in the range finding mode, a new merit that can avoid the above problem about the angle deviation is generated.

Further, in the laser radar device according to Embodiment 1, with respect to the transmission optical system 3, the two optical systems 31 and 32 are switched digitally; however, they may be provided with a system such that the spread angle of the laser is gradually changed as being analog. Specifically, this system can be achieved such that when a cylindrical lens is employed, and a function of varying a clearance between the pulse laser and the above cylindrical lens is established.

It is noted that in the laser radar device according to Embodiment 1, it is described as applied to a safe landing sensor for planetfall; however, an unprecedented effect emerges even if the laser radar device is applied to a docking sensor between objects, by way of example, between space apparatuses (docking sensor for space apparatus). When the laser radar sensor in one of the space apparatuses is installed, and a rough range to the other space apparatus under the operation in the above altimeter mode is measured at a long range, or it is shifted to the imaging mode at a short range to thereby perform a terminal docking operation, a more accurate and safe system operation becomes possible.

Furthermore, when this laser radar sensor is installed in a space apparatus for collecting space debris, and used as a space debris collection sensor, and a similar operation to that of the above docking sensor is performed, a more accurate system operation becomes possible.

Moreover, when the laser radar device according to Embodiment 1 is installed in a motor vehicle, an unconventional effect is obtained as a vehicle-mounted collision avoidance sensor with high accuracy. When it is configured that at a long range, a rough range to an obstacle in a specific direction (for example, forward) is measured by the operation in the above range finding mode, and at a short range, acquisition of a detailed three-dimensional shape is carried out by shifting to the imaging mode, a more accurate and safe collision prevention operation becomes possible.

It is noted that in the present invention, it is possible to modify any component of the embodiments, or omit any component in the embodiments within the scope of the invention.

INDUSTRIAL APPLICABILITY

Since the laser radar device according to the present invention can start the measurement operation at a farther distance as compared with the conventional one, it is suitable for use in a laser radar device and so on that have the array receiver, and combine the range finding mode that measures the range to the specified place on the target with the imaging mode that measures the three-dimensional shape of the target.

EXPLANATION OF REFERENCE NUMERALS

1: laser driver, 2: pulse laser, 3: transmission optical system, 4: folding mirror, 5: scanner mirror, 6: optical reception system, 7: light-receiving element array, 8: electric circuit array, 9: signal processing unit, 10: control unit, 11: planetary exploration spacecraft, 12: planetary surface, 31: optical system for a highly-directional beam, 32: optical system for a fan beam, 51: motor, 91: range/three-dimensional shape output unit, 92: determination unit.

The invention claimed is:

1. A laser radar device, comprising:
   a light source that outputs transmission light to a target;
   an transmission optical system that makes the transmission light output by the light source at a predetermined beam spread angle;
   a light-receiving element array that receives scattered light from the target with respect to the transmission light made at the predetermined beam spread angle by the transmission optical system and that converts the resultant to an electric signal;
   an electric circuit array that detects a reception intensity and a reception time from the electric signal converted by the light-receiving element array;
   a measuring unit that measures a range to the target or a three-dimensional shape of the target on the basis of the reception time detected by the electric circuit array;
   a determination unit that determines whether or not the beam spread angle by the transmission optical system is changed on the basis of the reception intensity and the reception time detected by the electric circuit array; and
   a controller that changes the beam spread angle by the transmission optical system on the basis of a determination result by the determination unit,
   wherein when the range to the target shifts from a long range to a short range, the controller changes the beam spread angle by the transmission optical system on the basis of the determination result by the determination unit, and also the measuring unit shifts from a range finding mode that measures the range to the target to an imaging mode that measures a three-dimensional shape of the target.

2. The laser radar device according to claim 1, wherein the determination unit performs the determination on the basis of at least one of the range to the target, the reception intensity, and a reception S/N ratio based on the reception intensity.

3. A safe landing sensor for planetfall, wherein there is equipped with the laser radar device according to claim 1.

4. A docking sensor for space apparatus, wherein there is equipped with the laser radar device according to claim 1.

5. A space debris collection sensor, wherein there is equipped with the laser radar device according to claim 1.

6. A vehicle-mounted collision avoidance sensor, wherein there is equipped with the laser radar device according to claim 1.

* * * * *